N. THOMPSON.
PIPE COUPLING.
No. 69,142. Patented Sept. 24, 1867.
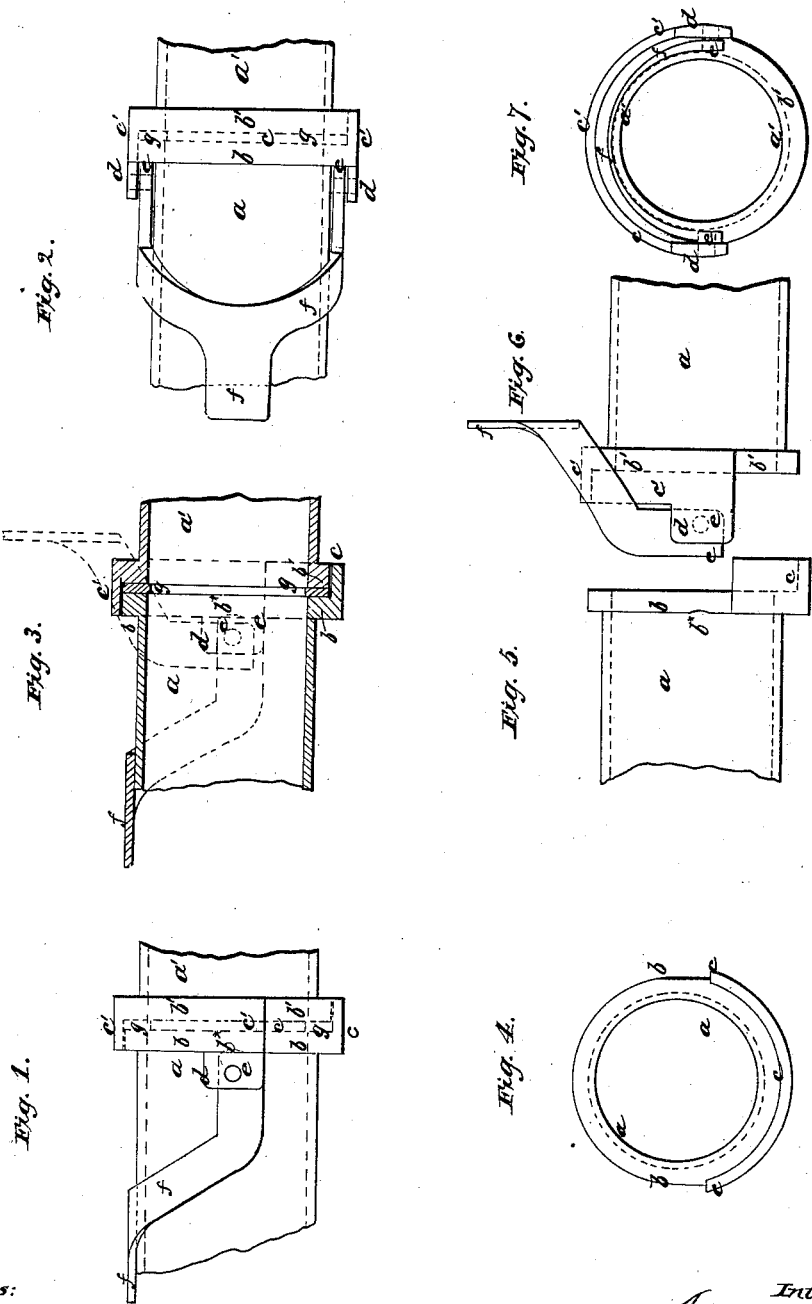

United States Patent Office.

NATHAN THOMPSON, OF ST. JOHN'S WOOD, ENGLAND.

Letters Patent No. 69,142, dated September 24, 1867; patented in England March 15, 1867.

---

IMPROVEMENT IN PIPE-COUPLING.

---

The Schedule referred to in these Letters Patent and making part of the same.

---

TO ALL TO WHOM IT MAY CONCERN:

Be it known that I, NATHAN THOMPSON, of 15 Abbey Gardens, St. John's Wood, in the county of Middlesex, England, a citizen of the United States of America, have invented or discovered new and useful "Improvements in Means or Apparatus for Connecting together the Ends of Pipes or Tubes, which improvements are also applicable for connecting together other articles;" and I, the said NATHAN THOMPSON, do hereby declare the nature of the said invention, and in what manner the same is to be performed, to be particularly described and ascertained in and by the following statement thereof; that is to say:

For this purpose the ends of the pipes or tubes are made or provided with flanges, and each flange, by preference, is partly surrounded by a portion of a short cylinder or socket, so that when the ends of two pipes or tubes are brought together in position for the connection to be effected, a more or less complete socket is formed. Between the ends of two pipes or tubes suitable washers or packings are introduced, and in order to draw the two ends, and to hold them tightly together, the following means or apparatus is employed: Lugs, ears, or projections are fixed or formed on the end of one or of both the pipes or tubes, to which lugs, ears, or projections, cams, eccentrics, or locking-pieces are pin-jointed or otherwise connected, with capability of turning upon a centre of motion; and I prefer to connect two of such cams, eccentrics, or locking-pieces together, (one being on each side of the joint,) thereby permitting of their being simultaneously acted upon by a lever connected or applied thereto, which lever, when the two pipes or tubes are securely connected together, lies close to the pipes or tubes. And in order to prevent the parts moving when once the cams, eccentrics, or locking-pieces have been acted upon to compress the washers or packings between the flanges to the desired extent, I form the acting or nipping parts of the cams, eccentrics, or locking-pieces somewhat on one side of their centres of motion. Other suitable means, may, however, be employed to retain the levers and parts from moving, when once brought into their holding positions, until force is applied in the proper direction to release them from their holding. And in order that my invention may be more fully understood and readily carried into effect, I will proceed, aided by the accompanying drawings, more fully to describe the same.

Figure 1 is a side view of the ends of two pipes or tubes, connected together according to my invention.

Figure 2 is a plan, and

Figure 3 is a sectional view, showing the parts in the position they would assume when the connection is completely effected.

Figure 4 is a side view, and

Figure 5 is an end view of the end of one of the pipes or tubes, and

Figure 6 is a side view, and

Figure 7 an end view of the end of the other pipe or tube, with parts applied thereto according to my invention.

$a\ a'$ are the ends of the two pipes to be connected together; $b\ b'$ are flanges, which may be formed thereon or fixed thereto in any suitable manner, and $c\ c'$ are portions of cylinders connected to such flanges; $d\ d$ are ear-lugs or projections connected to the flange $b'$, and having cams, eccentrics, or locking-pieces $e\ e$ pin-jointed thereto, and, as shown in the drawings, I prefer to connect such cams, eccentrics, or locking-pieces together in pairs, by means of a lever, $f$. One of each of such cams, eccentrics, or locking-pieces being on opposite sides of the pipe, suitable elastic or compressible washers or packings, $g$, are employed between the ends of the two pipes or tubes, and when the parts are placed in position, and the lever $f$ turned so as to lie close to the pipe or tube, as shown in figs. 1, 2, and 3, such washers or packings are compressed between the ends of the pipes or tubes, and a secure joint is thereby made. In fig. 3 the lever $f$ is shown by dotted lines, and in fig. 6 by full lines in the position it would assume preparatory to the sliding of the two flanges $b\ b$ upon each other in position for the connection to be made. It will be seen by reference to the drawings that the nipping parts of the cams, eccentrics, or locking-pieces are formed slightly at one side of their centres of motion, thereby tending, when the joint is made, to retain the lever $f$ in its locked position; other suitable means may, however, be employed for this purpose. And in order that such nipping parts may continue to nip the flange during its entire movement, I form inclines $b^*$ on the flange $b$, as shown, but I do not confine myself thereto, as the cams, eccentrics, or locking-pieces may be of a suitable form for this purpose. The portions of cylinder $c\ c'$, when brought together, form an entire ring, and thereby effectually enclose and protect the washers or packings $g$ from injury.

It will be readily understood that the invention is equally applicable to all kinds of metal and other tubes, and may be cast on, or brazed, or soldered thereto, or the flanges, cylinders, and locking-pieces may be formed separately from such pipes or tubes, and the union thereof may be effected by forming flanges on the pipes or tubes and enclosing them between the flanges of the connecting means, as will be readily understood, suitable washers or packings being introduced between the parts. I would have it understood that although I have shown only two cams, eccentrics, or locking-pieces $e$ $e$ in the drawing, other numbers of such cams, eccentrics, or locking-pieces may be employed, as will be readily understood, and they may, when more than two are employed, be acted upon separately.

The invention is particularly applicable to such pipes or tubes as require to be frequently and quickly connected or disconnected with each other, or with other articles, and I would have it understood that although I have described the invention as applied to pipes or tubes, similar means may be employed for connecting together other articles, as will be readily understood.

Having thus described the nature of my invention, and the mode in which I carry the same into effect, I would have it understood that I do not confine myself to the precise details herein shown and described, but what I do claim, is—

1. The general combination and arrangement of parts for connecting together the ends of pipes or tubes, substantially as herein shown and described.

2. I claim the application of cams, eccentrics, or locking-pieces $e$ $e$, or equivalents therefor, substantially as and for the purpose herein shown and described; and 3. I claim the mode herein shown and described of operating upon such cams, eccentrics, or locking-pieces $e$ $e$, by means of levers $f$, substantially as and for the purpose herein shown and described.

NATHAN THOMPSON.

Witnesses:
E. S. Renwick,
Henry B. Renwick.